(12) United States Patent
Donderici et al.

(10) Patent No.: US 10,670,562 B2
(45) Date of Patent: Jun. 2, 2020

(54) MICRO-FOCUSED IMAGING OF WELLBORE PIPE DEFECTS

(71) Applicant: Halliburton Energy Services, Inc., Houston, TX (US)

(72) Inventors: Burkay Donderici, Houston, TX (US); Luis Sanmartin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/890,070

(22) PCT Filed: Jun. 25, 2015

(86) PCT No.: PCT/US2015/037693
§ 371 (c)(1),
(2) Date: Nov. 9, 2015

(87) PCT Pub. No.: WO2016/007308
PCT Pub. Date: Jan. 14, 2016

(65) Prior Publication Data
US 2016/0178579 A1    Jun. 23, 2016

Related U.S. Application Data

(60) Provisional application No. 62/023,565, filed on Jul. 11, 2014.

(51) Int. Cl.
*G01N 27/82* (2006.01)
*E21B 47/00* (2012.01)
*E21B 47/08* (2012.01)

(52) U.S. Cl.
CPC ......... *G01N 27/82* (2013.01); *E21B 47/0002* (2013.01); *E21B 47/0006* (2013.01); *E21B 47/082* (2013.01)

(58) Field of Classification Search
CPC ........ G01N 27/82; G01N 27/83; G01N 27/90; G01N 27/9006; G01N 27/9013;
(Continued)

(56) References Cited

U.S. PATENT DOCUMENTS 4,107,605 A * 8/1978 Hudgell ............. G01N 27/9033
324/220
4,292,589 A * 9/1981 Bonner ................. E21B 47/082
324/221
(Continued)

FOREIGN PATENT DOCUMENTS

JP    H07-077517 A    3/1995
JP    H07-77517 A     3/1995
(Continued)

OTHER PUBLICATIONS

Haugland, S.M., Fundamental Analysis of the Remote-Field Eddy-Current Effect, IEEE Transactions on Magnetics, vol. 32, No. 4, 1996.
(Continued)

*Primary Examiner* — Lee E Rodak
(74) *Attorney, Agent, or Firm* — McGuireWoods LLP

(57) ABSTRACT

A method includes positioning a coil antenna in a first pipe concentrically arranged within a second pipe, the coil antenna having a first terminal, a second terminal, and one or more wires that exhibit a winding density proceeding radially between the first and second terminals according to a given function. The first and second terminals are then excited with an alternating current or voltage, and a signal is measured between the first and second terminals. A characteristic of at least one of the first and second pipes is then calculated based on the signal.

22 Claims, 7 Drawing Sheets

(58) Field of Classification Search
CPC ............. G01N 27/902; G01N 27/9033; G01N 27/904; G01N 27/9046; G01N 27/9073; E21B 47/0002; E21B 47/0006; E21B 47/082; E21B 47/0905; G01V 3/18; G01V 3/26; G01V 3/28
USPC ....... 324/219–221, 237, 238, 240, 332, 333, 324/334, 335, 338, 342, 343, 344, 345, 324/347, 354, 300–318, 34, 4
See application file for complete search history.

(56) References Cited

U.S. PATENT DOCUMENTS

| | | | | |
|---|---|---|---|---|
| 4,706,020 | A * | 11/1987 | Viertl | G01N 27/9033 324/238 |
| 6,344,739 | B1 * | 2/2002 | Hardy | G01N 27/902 324/220 |
| 7,402,999 | B2 * | 7/2008 | Plotnikov | G01N 27/902 324/220 |
| 7,420,367 | B2 * | 9/2008 | Bespalov | E21B 47/0002 324/303 |
| 7,560,920 | B1 * | 7/2009 | Ouyang | G01N 27/902 324/240 |
| 2001/0038711 | A1 * | 11/2001 | Williams | G06K 9/222 382/181 |
| 2001/0054896 | A1 * | 12/2001 | Mednikov | G01B 7/10 324/225 |
| 2002/0105333 | A1 | 8/2002 | Amini | |
| 2005/0057251 | A1 * | 3/2005 | Suits | G01V 3/105 324/318 |
| 2007/0034374 | A1 | 2/2007 | Gerez et al. | |
| 2008/0170467 | A1 | 7/2008 | Barolak | |
| 2009/0195244 | A1 * | 8/2009 | Mouget | G01V 3/28 324/221 |
| 2012/0095686 | A1 | 4/2012 | Legendre et al. | |
| 2012/0103097 | A1 | 5/2012 | Lopez | |
| 2012/0112744 | A1 | 5/2012 | McDowell et al. | |
| 2012/0126798 | A1 * | 5/2012 | Rondinone | G01N 17/006 324/229 |
| 2012/0240681 | A1 | 9/2012 | Lopez | |
| 2013/0187641 | A1 * | 7/2013 | Singer | G01N 27/82 324/220 |
| 2013/0193953 | A1 | 8/2013 | Yarbro et al. | |
| 2013/0284723 | A1 * | 10/2013 | Weder | H05B 6/062 219/624 |
| 2014/0028300 | A1 | 1/2014 | Jamoussi et al. | |
| 2015/0204648 | A1 * | 7/2015 | Nichols | G01B 7/10 324/229 |

FOREIGN PATENT DOCUMENTS

| | | |
|---|---|---|
| WO | 2006099133 A1 | 9/2006 |
| WO | 2014018292 A1 | 1/2014 |
| WO | 2016007308 | 6/2015 |

OTHER PUBLICATIONS

Al-Yateem, et al., Measuring and Profiling Casing Corrosion for Predicting Subsurface Leaks, IPTC 17170, 2013.
Brill, et al., Electromagnetic Casing Inspection Tool for Corrosion Evaluation, IPTC 14865, 2012.
Arbuzov et al., Memory Magnetic Imaging Defectoscopy, SPE 162054, 2012.
Garcia, et al., Successful Application of a New Electromagnetic Corrosion Tool for Well Integrity Evaluation in Old Wells Completed with Reduced Diameter Tubular, IPTC 16997, 2013.
Magnetic Thickness Tool, Company: GE Energty-GE, Tool: Sondex Wireline Tools-Cased Hole Products, no date.
International Search Report and Written Opinion for PCT/US2015/037693 dated Sep. 24, 2015.
Goldfine, Neil, Surface-Mounted Eddy-Current Sensor for On-Line Monitoring of Fatigue Tests and for Aircraft Health Monitoring, Second Joint NASA/FAA/DoD Conference on Aging Aircraft, Aug. 1998.
Goldfine et al., Conformable Eddy-Current Sensors and Arrays for Fleetwide Gas Turbine Component Quality Assessment, ASME Journal of Engineering for Gas Turbines and Power, vol. 124, No. 4, pp. 904-909, Oct. 2002.
Goldfine, Neil, MWM-Array Eddy Current Sensors for Detection of Cracks in Regions with Fretting Damage, ASNT Materials Evaluation, Uly 2002, vol. 60, No. 7.
Extended European Search Report from European Patent Application No. 15818753.4, dated Feb. 2, 2018, 10 pages.
European Examination Report dated Jul. 4, 2019; European Patent Application No. 15818753.4.

\* cited by examiner

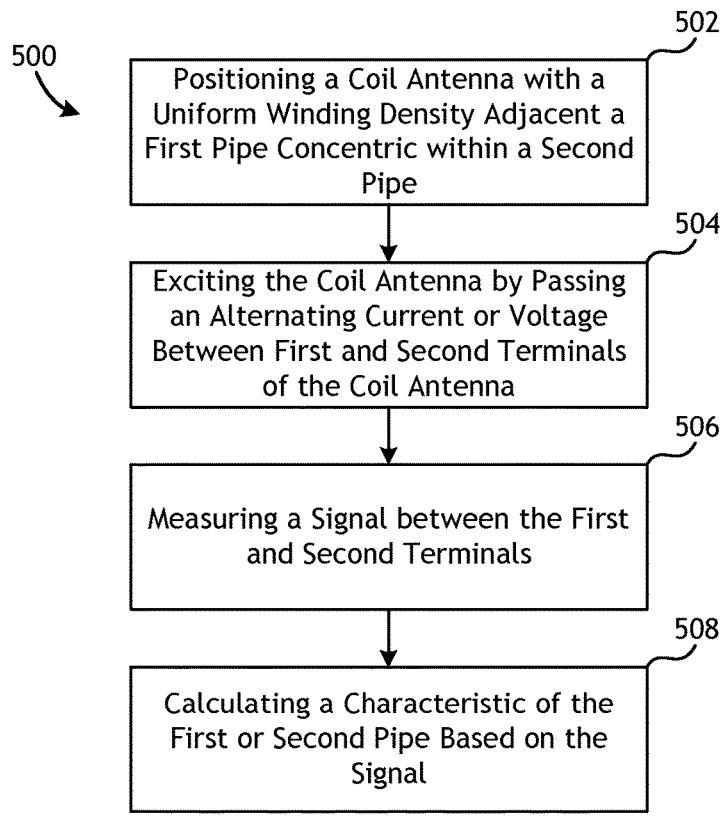
FIG. 5
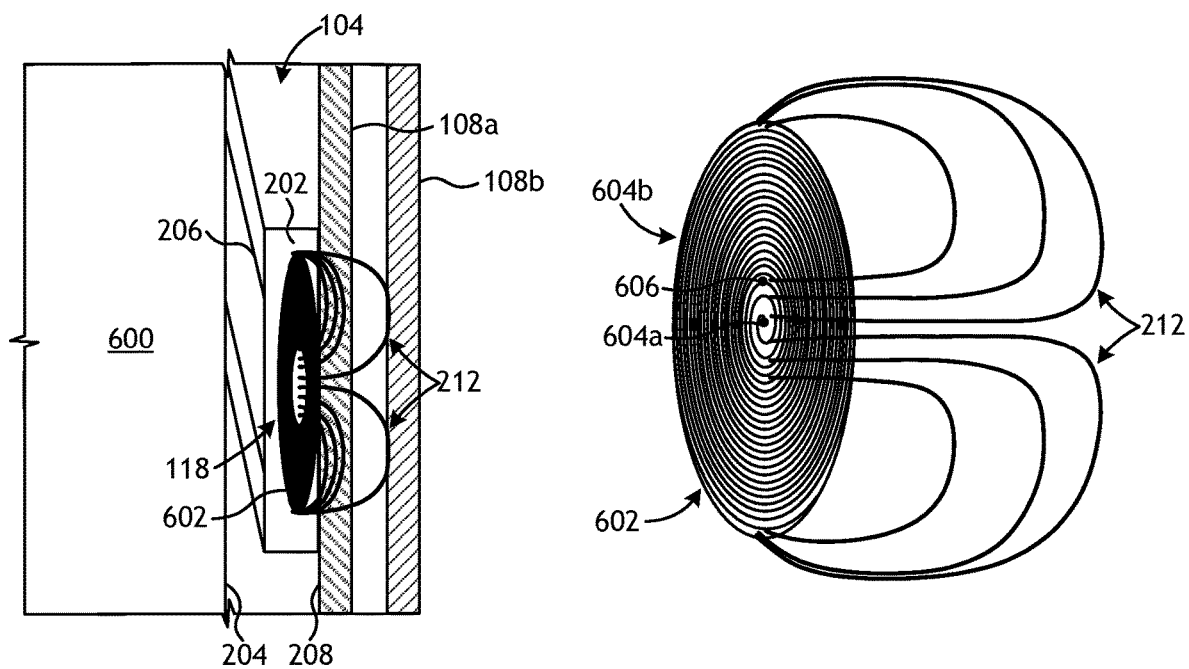
FIG. 6A
FIG. 6B

MICRO-FOCUSED IMAGING OF WELLBORE PIPE DEFECTS

CROSS-REFERENCE TO RELATED APPLICATIONS

This application is a National Stage entry of and claims priority to International Application No. PCT/US2015/037693, filed on Jun. 25, 2015, which claims priority to U.S. Provisional Patent App. Ser. No. 62/023,565, filed on Jul. 11, 2014.

BACKGROUND

Wellbores in the oil and gas industry are typically drilled using a drill string with a drill bit secured to its distal end. The drilled wellbore is subsequently completed by cementing a string of metal pipes connected end-to-end within the wellbore. Commonly called "casing," such strings of metal pipes increase the integrity of the wellbore and provides a flow path between the earth's surface and selected subterranean formations. As used herein, the terms "pipes," "casing," and "pipelines" and variations thereof may be used interchangeably to cooperatively refer to the metal pipes or pipelines that line the walls of a wellbore.

The pipes that make up the casing may be made of plain carbon steel, stainless steel, or another material able to withstand a variety of forces, such as collapse, burst, and tensile failure. During the lifetime of a well, the casing is exposed to high volumes of materials and fluids required to pass through them, including chemically aggressive fluids. In harsh environments, however, the casing may be subject to corrosion that may affect its functionality. Timely and accurate detection of structural integrity problems such as cracks, pinholes, and corrosion is essential to reducing costs associated with wellbore intervention, since pulling a casing pipe out of a wellbore for further inspection and repairs and replacing can be a very expensive task.

Some wellbores include multiple concentric pipes or strings of casing secured within the wellbore with an innermost pipe that exhibits a relatively narrow diameter. As will be appreciated, the diameter of the innermost pipe limits the size of the monitoring and intervention system that can be deployed to monitor the integrity of all of the concentric pipes. With multiple concentric pipes, another problem is the ability to effectively monitor the outermost pipes from the innermost pipe, since any monitoring system has to be able to sense through a number of pipe layers, each of which may have developed distinct problems or defects.

Several different sensing methods have been proposed for detecting corrosion and other types of defects in pipelines, some of which have been applied to wellbore pipes used for extracting hydrocarbons. The most common method utilizes acoustic wave pulses and analysis of reflections from the surface of a pipe wall to image any defects. Electromagnetic inspection methods are also used for the same purpose, and are desirable since they allow an operator to sense beyond the first pipe, and thereby obtain measurements from second, third, or additional pipes beyond the third pipe. Existing pipe inspection methods, however, are either azimuthally sensitive and shallow or azimuthally insensitive and deep.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 5 is a schematic flowchart of an exemplary method of operating the coil antenna of FIGS. 2A-2B, 3A-3B, and 4.

FIG. 6A is a partial cross-sectional view of another exemplary pipe inspection tool.

FIG. 6B is an enlarged view of the coil antenna of FIG. 6A.

DETAILED DESCRIPTION

The present disclosure is related to maintenance of wellbores in the oil and gas industry and, more particularly, to monitoring and evaluating corrosion in wellbore completion components, such as casing strings or other pipes arranged in a wellbore.

Embodiments of the present disclosure provide improved electromagnetic pipe inspection methods. These methods generally rely on circularly wound coil antennas with a specially designed winding density that can focus the magnetic fields beyond a first pipe. This allows maximizing the signal that reaches a second pipe concentrically-arranged about the first pipe, which results in increased sensitivity to features of the second pipe, such as thickness and defects of the second pipe.

While existing eddy current methods used for micro-imaging pipe features are very shallow and cannot be used to sense second or third pipes, the embodiments of the present disclosure can focus the magnetic fields and significantly increase the sensitivity to features of pipes beyond the first. In addition, most of the existing two-dimensional coil antenna windings that are available in prior art so far are of the meandering type, which does not separate out the magnetic poles far enough for deep sensing. The embodiments described herein optimally utilize the available space for deep sensitivity.

Figure 1:
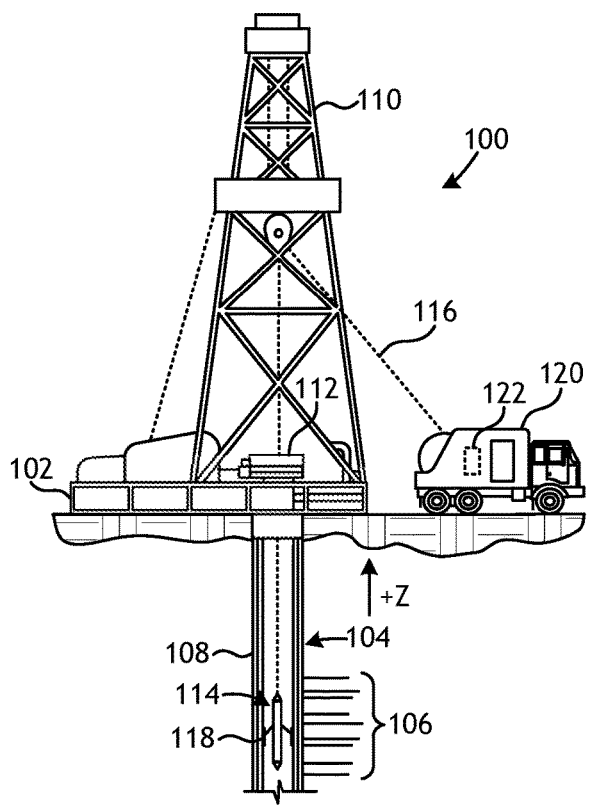
FIG. 1 is a schematic diagram of an exemplary wireline system 100 that may employ the principles of the present disclosure.

FIG. 1 is a schematic diagram of an exemplary wireline system 100 that may employ the principles of the present disclosure, according to one or more embodiments. As illustrated, the wireline system 100 may include a surface platform 102 positioned at the earth's surface and a wellbore 104 that extends from the surface platform 102 into one or more subterranean formations 106. In other embodiments, such as in offshore drilling operations, a volume of water may separate the surface platform 102 and the wellbore 104. The wellbore 104 may be lined with one or more pipes 108, also referred to as strings of casing. In some embodiments, portions of the wellbore 104 may have only one pipe 108 positioned therein, but other portions of the wellbore 104 may be lined with two or more concentrically-disposed pipes 108. The pipes 108 may be made of plain carbon steel, stainless steel, or another material capable of withstanding a variety of forces, such as collapse, burst, and tensile failure.

The wireline system 100 may include a derrick 110 supported by the surface platform 102 and a wellhead installation 112 positioned at the top of the wellbore 104. A pipe inspection tool 114 may be suspended into the wellbore 104 on a cable 116. The pipe inspection tool 114 may include one or more electromagnetic sensors 118, which may be communicably coupled to the cable 116. The cable 116 may include conductors for conveying power to the pipe inspection tool 114 and also facilitate communication between the surface platform 102 and the pipe inspection tool 114. A logging facility 120, shown in FIG. 1 as a truck, may collect measurements from the electromagnetic sensors 118, and may include computing facilities 122 for controlling, processing, storing, and/or visualizing the measurements gathered by the electromagnetic sensors 118. The computing facilities 122 may be communicably coupled to the pipe inspection tool 114 by way of the cable 116.

The electromagnetic sensors 118 may include one or more electromagnetic antenna coils that may be used as transmitters, receivers, or transceivers for obtaining in situ measurements of the pipe(s) 108 to help determine the structural integrity or condition of each pipe 108. In some embodiments, the electromagnetic sensors 118 may be designed to operate in a centralized position within the innermost pipe 108, such as through the use of one or more centralizers (not shown). In other embodiments, however, the electromagnetic sensors 118 may be designed to be in intimate contact with the inner wall of the innermost pipe 108. In such embodiments, the electromagnetic sensors 118 may be mounted on one or more deployable sensor pads positioned on actuatable arms that move the electromagnetic sensors 118 radially outward and into engagement with the inner wall of the innermost pipe 108.

Figure 2A:
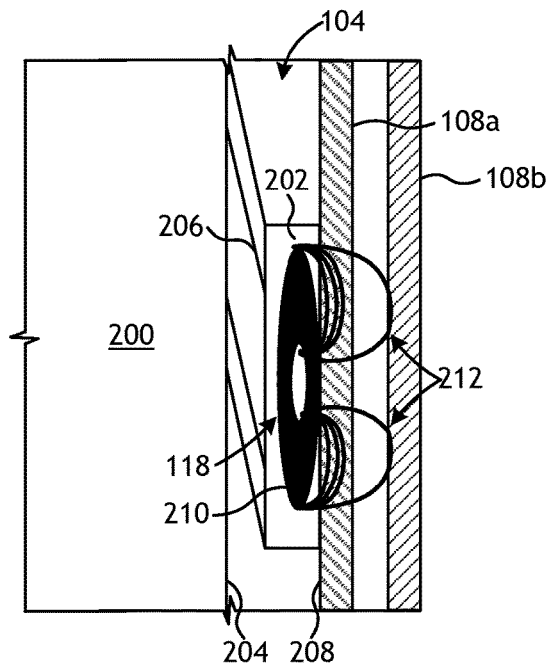
FIG. 2A is a partial cross-sectional view of an exemplary pipe inspection tool.

FIG. 2A depicts a partial cross-sectional view of an exemplary pipe inspection tool 200, according to one or more embodiments of the disclosure. The pipe inspection tool 200 may be the same as or similar to the pipe inspection tool 114 of FIG. 1, and therefore may be deployed within the wellbore 104 and used to monitor the pipes 108 that line the wellbore 104 for corrosion or defects. The pipes 108 are shown in FIG. 2A as a first pipe 108a and a second pipe 108b, where the first pipe 108a is concentrically-arranged or positioned within the second pipe 108b.

The pipe inspection tool 200 may include a sensor pad 202 that is radially extendable from a body 204 of the pipe inspection tool 200 using one or more actuatable arms 206.

While only one sensor pad 202 is depicted in FIG. 2A, in at least one embodiment, the pipe inspection tool 200 (or any of the pipe inspection tools described herein) may employ multiple sensor pads 202 spaced about the circumference of the body 204. In at least one embodiment, for example, the pipe inspection tool 200 may include six sensor pads 202 equidistantly spaced about the circumference of the body 204 (i.e., at 60° intervals). The sensor pad 202 may be movable from a retracted position, where the sensor pad 202 is located adjacent the body 204, to an actuated or extended position, where the actuatable arms 206 extend the sensor pad 202 radially toward and/or into contact with an inner wall 208 of the first pipe 108a (i.e., the innermost pipe).

One or more electromagnetic sensors 118 (one shown) may be positioned or otherwise arranged on the sensor pad 202. As illustrated, the electromagnetic sensor 118 may include at least one coil antenna 210. The coil antenna 210 is positioned on the sensor pad 202, which radially extends to push the coil antenna 210 adjacent or otherwise into engagement with the inner wall 208 of the first pipe 108a. The surface of the sensor pad 202 and the coil antenna 210 may conform to the curved shape of the pipe either by design, or through the use of a flexible substrate upon which the coil antenna 210 is positioned. In at least one embodiment, a flexible printed circuit board may be used for this purpose.

Figure 2B:
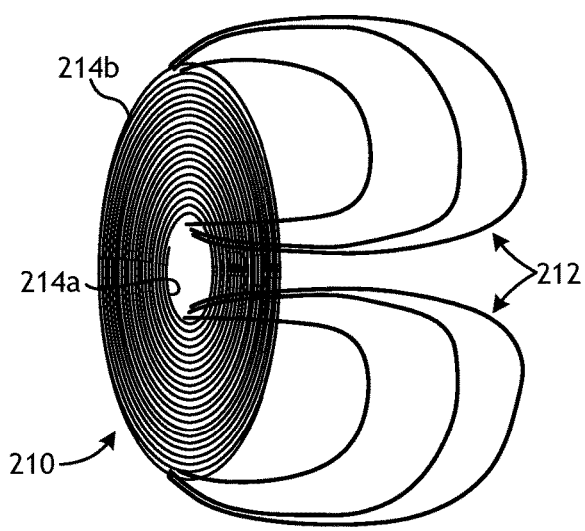
FIG. 2B is an enlarged view of the coil antenna of FIG. 2A.

As best seen in FIG. 2B, upon excitation with an alternating current or voltage, the coil antenna 210 may generate one or more magnetic fields 212 that extend radially outward from it. Specifically at low frequencies, the generated magnetic fields 212 follow a path dictated by the location of the hypothetical poles of the equivalent dipole of the coil antenna 210. In the illustrated embodiment, and based on rules that govern continuity of magnetic fields, equivalent magnetic charges are generated close to an inner perimeter 214a and an outer perimeter 214b of the coil antenna 210, each of which are depicted as generally circular in shape.

Figure 3A:
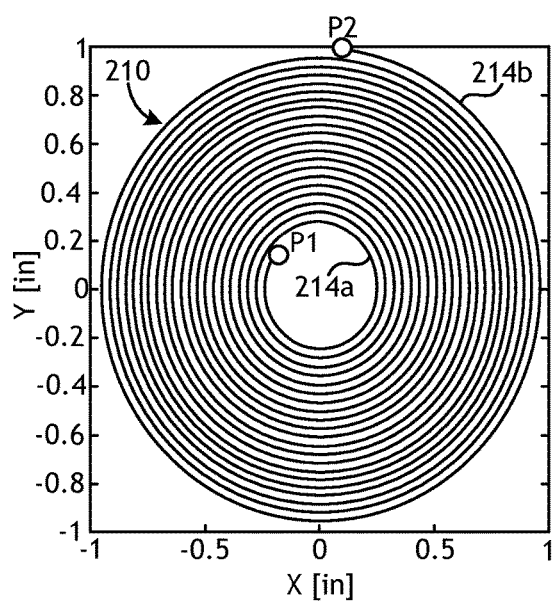
FIG. 3A is a schematic diagram of the coil antenna of FIGS. 2A and 2B.

FIG. 3A is a schematic diagram of the coil antenna 210 of FIGS. 2A and 2B. As illustrated, the coil antenna 210 may comprise a spiral wound wire structure that extends continuously between a first terminal P1 and a second terminal P2. The first and second terminals P1, P2 may also be referred to as first and second "ports." The coil antenna 210 is depicted in a generally circular shape, but could alternatively comprise any polygonal shape, such as square or rectangular. As compared to a polygonal-shaped coil antenna, however, the circular-shaped coil antenna 210 may generate a smoother distribution of the magnetic field 212 (FIG. 2B), which may result in better, more symmetric images of pipe defects.

The coil antenna 210 is depicted in FIG. 3A as a spiral-wound structure, where a single wire or conductor extends continuously between the first and second terminals P1, P2. In other embodiments, however, the coil antenna 210 (or any of the coil antennas described herein) may alternatively comprise a plurality of concentric wire loops or rings, either circular or polygonal in shape. The plurality of concentric wire rings may be arranged in series or may alternatively be independently excitable. In such embodiments, each ring may be excited separately and its radius from the center of the coil antenna 210 may be adjusted or optimized based on a prescribed distance from the center of the coil antenna 210. Use of multiple independent wire rings for the coil antenna 210, however, may not be as ideal as a spiral-wound wire configuration since a spiral configuration will have less number of excitation terminals, and it is a simpler electrical design.

The coil antenna 210 may also exhibit a winding density that may proceed radially between the inner and outer perimeters 214a,b or between the first and second terminals P1, P2 according to a given winding density function. As used herein, the term "winding density" refers to the number of wires in a given radial distance (length) from the center of the coil antenna 210 (or any of the coil antennas described herein). Variations in the winding density of the coil antenna 210 may be achieved by varying the separation distance or "gap" between radially adjacent wires of a single continuous spiral shaped coil or of a plurality of concentric wire rings. In some embodiments, as shown in FIG. 3A, the winding density function can be generally uniform or constant between the inner and outer perimeters 214a,b (or between the first and second terminals P1, P2), where there is no change in radial distance between radially adjacent wires. In other embodiments, as discussed below, the winding density function can vary linearly between the inner and outer perimeters 214a,b (or between the first and second terminals P1, P2). A linearly changing winding density function may result in a constant increase or decrease in the radial gap between radially adjacent wires.

It will be appreciated that different sections or regions of the coil antenna 210, or any of the coil antennas described herein, may be electrically connected or disconnected to each other, depending on the electrical controls that are desired. For instance, in the case where different regions of the coil antenna 210 are electrically connected, the same current flows between those regions and it is not possible to independently adjust the currents. In the case with disconnected electrical regions, each region can be excited separately with a different current, which offers more degree of freedom to excite. Accordingly, the latter example may be able to produce more diverse information about the second pipe 108b (FIG. 2A).

Figure 3B:
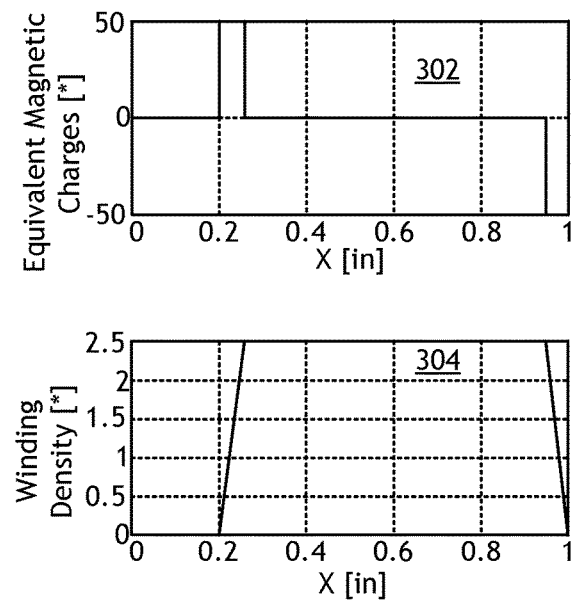
FIG. 3B depicts an equivalent magnetic charge plot and a winding density plot.

FIG. 3B depicts an equivalent magnetic charge plot 302 and a winding density plot 304 that graphically depict how exciting the coil antenna 210 of FIG. 3A affects the measured equivalent magnetic charge in view of a particular winding density exhibited by the coil antenna 210. As mentioned above, and as depicted in the equivalent magnetic charge plot 302, the equivalent magnetic charges are generated close to the inner and outer perimeters 214a,b of the coil antenna 210, which lie at approximately 0.2 inches and 0.95 inches, respectively, from the center of the coil antenna 210. More particularly, the first terminal P1 registers an equivalent magnetic charge of 50 between about 0.2 inches and about 0.25 inches from the center of the coil and acts as the survey magnetic field source. The equivalent magnetic charge is zero from 0.25 inches to the location of the second terminal P2 at about 0.95 inches from the center of the coil antenna 210, and the equivalent charge distribution between 0.95 inches and 1.00 inch is −50 and acts as the return. Accordingly, at low non-zero frequencies, magnetic fields flow from the inner perimeter 214a to the outer perimeter 214b to completing the magnetic circuit, essentially following the path depicted in FIG. 2B.

The winding density plot 304 shows that the coil antenna 210 has no winding density between zero inches and about 0.2 inches, but ramps up to a winding density of 2.5 between 0.2 inches and 0.25 inches, which corresponds to the location of the first terminal P1. The winding density remains uniform from 0.25 inches to about 0.95 inches, at which point the coil antenna 210 ends at the second terminal P2 and therefore drops back down to zero.

Figure 4:
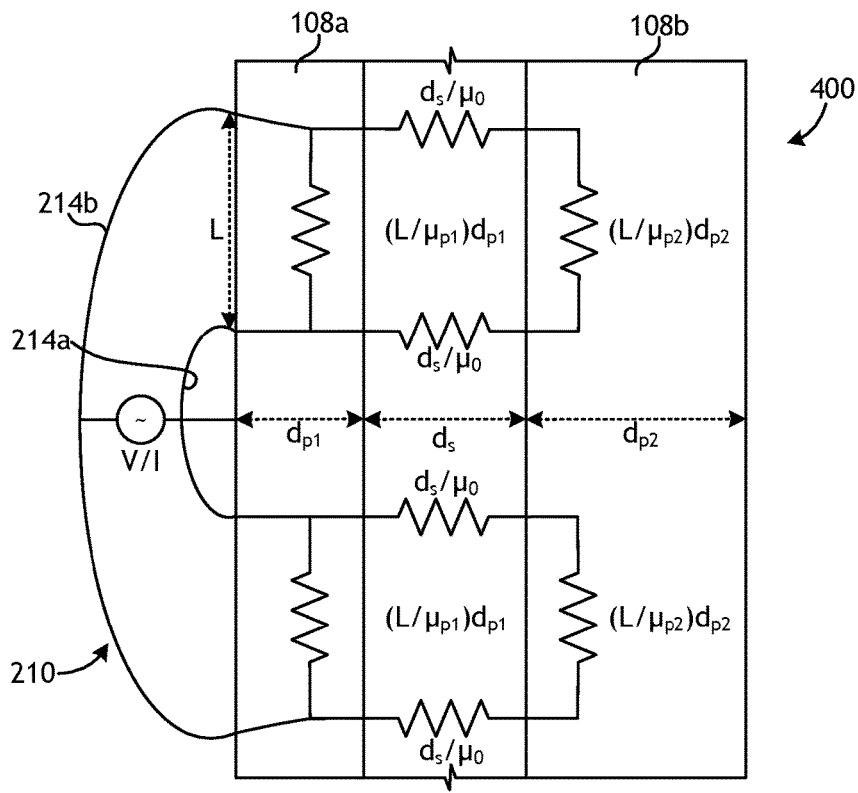
FIG. 4 is a schematic diagram of a magnetic circuit model.

Referring to FIG. 4, illustrated is a schematic diagram of a magnetic circuit model 400 that depicts the resistance of magnetic paths through the first and second pipes 108a,b, according to one or more embodiments. When the coil antenna 210 is placed next to a magnetically permeable pipe, such as the first and second pipes 108a,b, the generated magnetic field 212 (FIGS. 2A-2B) will tend to flow in the least magnetically resistant path, which is through the first pipe 108a. However, some of the magnetic field 212 may be able to penetrate the first pipe 108a and extend to the second pipe 108b, since the magnetic resistance of the path through the second pipe 108b may be comparable to that of the first pipe 108a.

The resistance of the magnetic path through the first pipe 108a is $(0.5L/\mu_{p1})/d_{p1}$, where L is the radial distance between the magnetic poles (i.e., the radial distance between the inner and outer perimeters 214a,b, respectively), $\mu_{p1}$ is the magnetic permeability of the first pipe 108a, and $d_{p1}$ is the thickness of the first pipe. The resistance of the magnetic path through the second pipe is $(0.5L/\mu_{p2})/d_{p2}+d_s/\mu_0$, where $\mu_{p2}$ is the magnetic permeability of the second pipe 108b, $d_{p2}$ is the thickness of the second pipe 108b, $d_s$ is the thickness or distance of a space 402 between the first and the second pipes 108a,b, and $\mu_0$ is the magnetic permeability of the space 402. It can be concluded that as long as $(0.5L/\mu_{p2})/d_{p2}+d_s/\mu_0<K\times(0.5L/\mu_{p1})/d_{p1}$, where K~10, there will be some considerable sensitivity to the features of the second pipe 108b. As will be appreciated, depending on the configuration of the coil antenna 210, the radial distance L may be increased to generate enough sensitivity to suitably measure the second pipe 108b.

While the magnetic circuit model 400 is described herein with reference to the coil antenna 210, it will be appreciated that the magnetic circuit model 400 may likewise be applicable to any of the coil antennas described herein, without departing from the scope of the disclosure.

FIG. 5 is a schematic flowchart of an exemplary method 500 of operating the coil antenna 210 of FIGS. 2A-2B, 3A, and 4, according to one or more embodiments. According to the method 500, the coil antenna 210 may be positioned adjacent a first pipe 108a (FIGS. 2A and 4), as at 502. As discussed above, the first pipe 108a may be concentrically-positioned within the second pipe 108b (FIGS. 2A and 4), and the coil antenna 210 may exhibit a uniform winding density function between the first and second terminals P1, P2 (FIG. 3A). The coil antenna 210 may then be excited by passing an alternating current or voltage between the two terminals P1, P2, as at 504. A signal may then be measured between the first and second terminals P1, P2, as at 506. When normalized by the excitation, the signal may comprise a measure of complex valued impedance between the two terminals P1, P2. Finally, one or more characteristics of the first pipe 108a and/or the second pipe 108b may be calculated based on the signal measured between the two terminals P1, P2, as at 508. Example characteristics the first and/or second pipes 108a,b that may be calculated include, but are not limited to, the thickness, the magnetic permeability, the conductivity, and the diameter of the first and second pipes 108a,b (or additional pipes beyond the second pipe 108b, if present). Details of converting the measured impedance to the pipe characteristics will be discussed below.

The coil antenna 210 of FIGS. 2A-2B, 3A, and 4 can produce sensitivity to the characteristics of the second pipe 108b, but may be insensitive to some of the characteristics of the first pipe 108a directly in front of the center of the coil antenna 210. Since no magnetic fields are emanating from the center of the coil antenna 210, sensitivity to any defect that is near the center will be weak or non-existent. In order to improve this feature, a second embodiment of the present disclosure is now provided.

FIGS. 6A and 6B depict a partial cross-sectional view of another exemplary pipe inspection tool 600 and an enlarged view of another exemplary coil antenna 602, respectively, according to one or more embodiments of the disclosure. The pipe inspection tool 600 may be similar in some respects to the pipe inspection tool 200 of FIG. 2A and therefore may be best understood with reference thereto, where like numerals represent like components or elements that may not be described again in detail. Similar to the pipe inspection tool 200 of FIG. 2A, for example, the pipe inspection tool 600 may be deployed within the wellbore 104 and used to monitor the first and second pipes 108a,b lining the wellbore 104. The pipe inspection tool 600 may further include the sensor pad 202 and at least one electromagnetic sensor 118 positioned thereon to be placed adjacent or in engagement with the inner wall 208 of the first pipe 108a using the actuatable arms 206.

Unlike the pipe inspection tool 200, however, the coil antenna 602 of the pipe inspection tool 600 has a winding density function that varies across at least a portion of the coil antenna 602 between a center 604a (FIG. 6B) of the coil antenna 602 and an outer perimeter 604b (FIG. 6B) thereof. More particularly, the winding density of the coil antenna 602 may linearly increase in a radial direction from the center 604a to an intermediate radial location 606 between the center 604a and the outer perimeter 604b. Since changes in the winding density result in the generation of magnetic fields, the magnetic fields 212 generated by the coil antenna 604 is injected (emitted) across the radial distance (length) between the center 604a and the intermediate radial location 606, as shown in FIG. 6B.

Figure 7A:
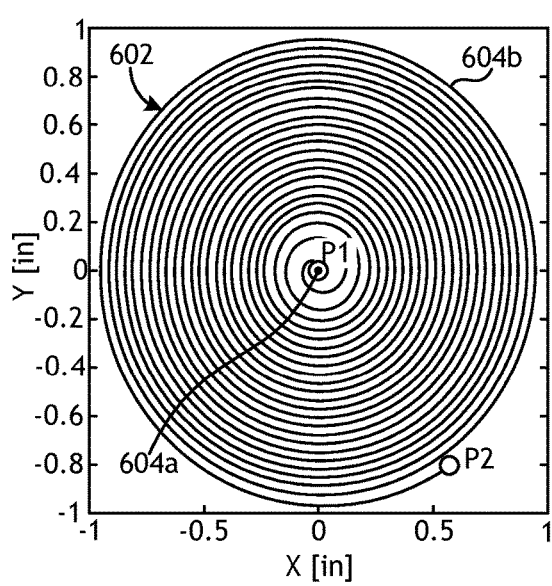
FIG. 7A is a schematic diagram of the coil antenna of FIGS. 6A and 6B.
Figure 7B:
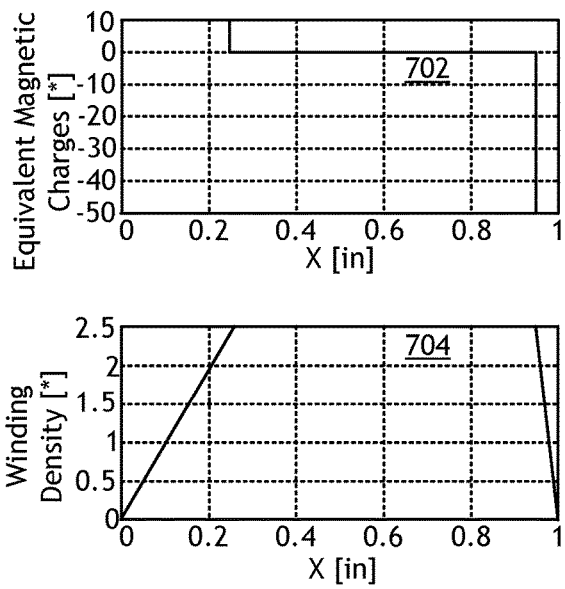
FIG. 7B depicts an equivalent magnetic charge plot and a winding density plot.

FIG. 7A is a schematic diagram of the coil antenna 602, and FIG. 7B depicts an equivalent magnetic charge plot 702 and a winding density plot 704 that graphically depict how exciting the coil antenna 602 affects the measured equivalent magnetic charge in view of the winding density function exhibited by the coil antenna 602. Similar to the coil antenna 210 of FIG. 3A, the coil antenna 602 may comprise a spiral wound wire structure that extends continuously between the first and second terminals P1, P2. The winding density of the coil antenna 602, however, linearly increases from the center 604a (i.e., 0.0 inches), where the first terminal P1 is located, to 0.25 inches from the center 604a, which equates to a magnetic charge distribution of about 10 that acts as the survey magnetic field source. The winding density is generally uniform or constant between 0.25 inches and the location of the second terminal P2 at about 0.95 inches. Accordingly, the equivalent magnetic charge is zero from 0.25 inches to 0.95 inches from the center 604a of the coil antenna 602, and the equivalent charge distribution between 0.95 inches and 1.00 inch is −50 and acts as the return.

Increasing the winding density across a radial length of the coil antenna 602 results in a magnetic field being injected across that radial length. Consequently, since the winding density increases from the center 604a of the coil antenna 602 to a radius of 0.25 inches, a substantially uniform magnetic field density 212 is generated across that radial distance, as shown in FIG. 6B. As a result, insensitivity at or near the center 604a of the coil antenna 602 is effectively removed. In some applications, the coil antenna 210 of FIGS. 2A-2B and 3A may be preferred over the coil antenna 602 of FIGS. 6A-6B and 7A as long as construction of the antenna coil 602 with the prescribed winding density as depicted in FIG. 6A is feasible.

Figure 8:
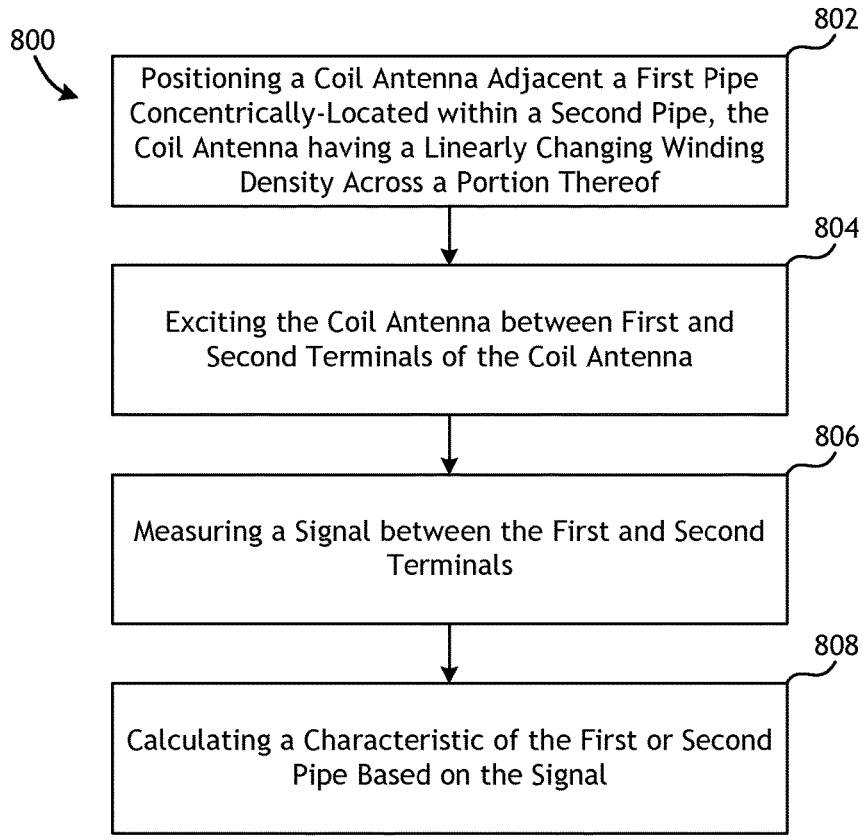
FIG. 8 is a schematic flowchart of an exemplary method of operating the coil antenna of FIGS. 6A-6B and 7A.

FIG. 8 is a schematic flowchart of an exemplary method 800 of operating the coil antenna 602 of FIGS. 6A-6B and 7A, according to one or more embodiments. According to the method 800, the coil antenna 602 may be positioned adjacent a first pipe 108a (FIG. 6A), as at 802, which may be concentrically-positioned within the second pipe 108b (FIG. 6A). Moreover, moreover, as discussed above, the coil antenna 602 may exhibit a linearly changing density across at least a portion of the coil antenna 602 between the first and second terminals P1, P2 (FIG. 7A) or between the center 604a and the outer perimeter 604b. The coil antenna 602 may then be excited by passing an alternating current or voltage between the two terminals P1, P2, as at 804. A signal may then be measured between the two terminals P1, P2, as at 806. When normalized by the excitation, the signal may comprise a measure of complex valued impedance between the two terminals P1, P2. Finally, one or more characteristics of the first pipe 108a and/or the second pipe 108b may be calculated based on the signal measured between the two terminals P1, P2, as at 808. Again, example characteristics the first and/or second pipes 108a,b that may be calculated include, but are not limited to, the thickness, the magnetic permeability, the conductivity, and the diameter of the first and second pipes 108a,b (or additional pipes beyond the second pipe 108b, if present), and details of converting the measured impedance to the pipe characteristics will be discussed below.

Figure 9A:
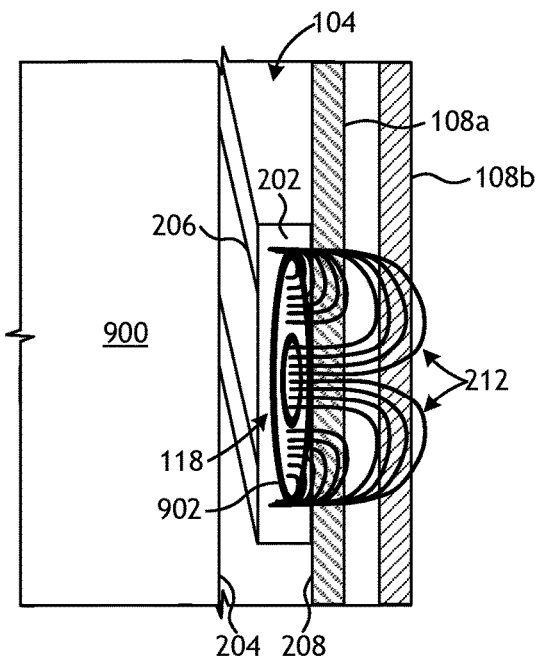
FIG. 9A is a partial cross-sectional view of another exemplary pipe inspection tool.
Figure 9B:
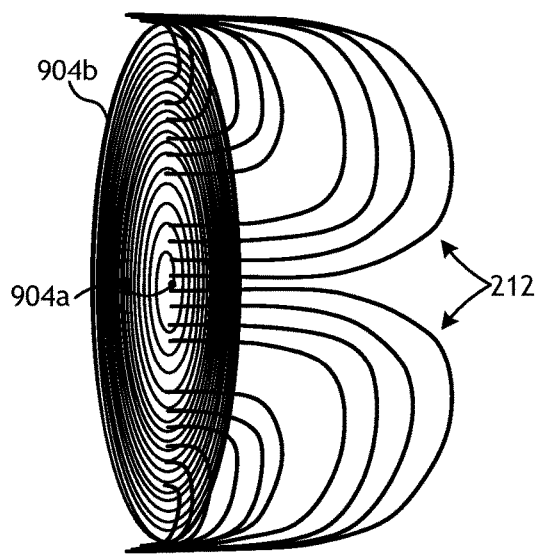
FIG. 9B is an enlarged view of the coil antenna of FIG. 9A.

FIGS. 9A and 9B depict a partial cross-sectional view of another exemplary pipe inspection tool 900 and an enlarged view of another exemplary coil antenna 902, respectively, according to one or more embodiments of the disclosure. The pipe inspection tool 900 may be similar in some respects to the pipe inspection tools 200 and 600 of FIGS. 2A and 6A, respectively, and therefore may be best understood with reference thereto, where like numerals represent like components or elements that may not be described again in detail. Similar to the pipe inspection tools 200 and 600 of FIGS. 2A and 6A, for example, the pipe inspection tool 900 may be deployed within the wellbore 104 and used to monitor the first and second pipes 108a,b lining the wellbore 104. The pipe inspection tool 900 may further include the sensor pad 202 and at least one electromagnetic sensor 118 positioned thereon to be placed adjacent or in engagement with the inner wall 208 of the first pipe 108a using the actuatable arms 206.

Unlike the pipe inspection tools 200 and 600, however, the coil antenna 902 of the pipe inspection tool 900 exhibits a more complicated winding density function that may be utilized to focus the magnetic fields 212 toward a center 904a of the coil antenna 902 and provide more shallow magnetic fields 212 near an outer perimeter 904b of the coil antenna 902.

Figure 10A:
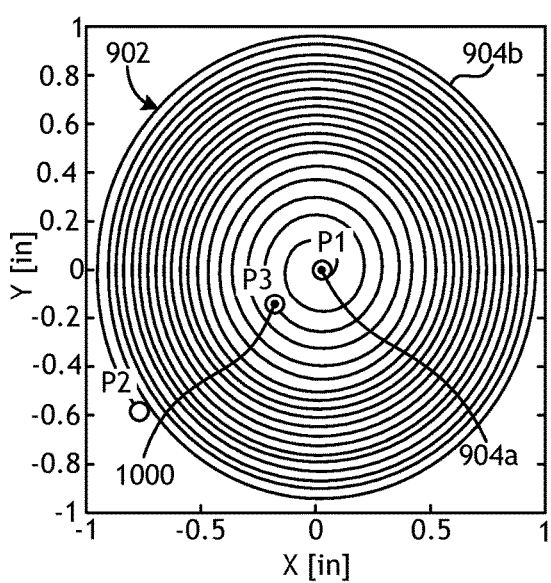
FIG. 10A is a schematic diagram of the coil antenna of FIGS. 9A and 9B.
Figure 10B:
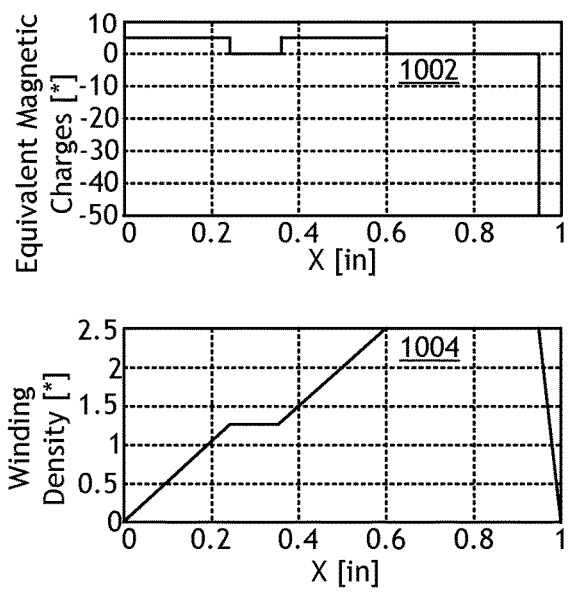
FIG. 10B depicts an equivalent magnetic charge plot and a winding density plot.

FIG. 10A is a schematic diagram of the coil antenna 902, and FIG. 10B depicts an equivalent magnetic charge plot 1002 and a winding density plot 1004 that graphically depict how exciting the coil antenna 902 affects the measured equivalent magnetic charge in view of the winding density function exhibited by the coil antenna 902. Similar to the coil antennae 210 and 602 of FIGS. 3A and 7A, respectively, the coil antenna 902 may comprise a spiral wound wire structure that extends between the first and second terminals P1, P2 and otherwise between the center 904a and the outer perimeter 904b of the coil antenna 902. Unlike the coil antennae 210 and 602, however, the coil antenna 902 may include a third terminal P3 that radially interposes the first and second terminals P1, P2 at an intermediate radial location 1000 between the center 904a and the outer perimeter 904b.

The winding density of the coil antenna 902 linearly increases from the center 904a (i.e., 0.0 inches), where the first terminal P1 is located and is equivalent to a magnetic charge distribution of about 5 that acts as the survey magnetic field source. The winding density linearly increases to 0.25 inches from the center 904a, which corresponds to the intermediate radial location 1000 and the location of the third terminal P3. At the third terminal P3, the equivalent magnetic charge drops to zero until about 0.35 inches, where the winding density of the coil antenna 902 again linearly increases until reaching around 0.6 inches from the center 904a. The equivalent magnetic charge between 0.35 inches and 0.6 inches is used for focusing the magnetic fields 212 (FIG. 9B). At 0.6 inches, the winding density proceeds generally uniform or constant until reaching the location of the second terminal P2 at about 0.95 inches. Accordingly, the equivalent magnetic charge is zero from 0.6 inches to 0.95 inches, and the equivalent charge distribution between 0.95 inches and 1.00 inch is −50 and acts as the return.

In the present embodiment, cross-coupling between the first and second terminals P1, P2 and between the first and third terminals P1, P3 may be recorded as the measurement. In general, it is possible to have two different excitations, one from the first terminal P1 to the third terminal P3, and another one from the third terminal P3 to the second terminal P2. Similarly, it may be possible to measure current or voltage between two different terminals, one measurement between the first terminal P1 and the third terminal P3, and another measurement between the third terminal P3 and the second terminal P2. Using a total of four combinations (i.e., two for excitation multiplied by two for measurement) and the electromagnetic linearity principle, it may be possible to calculate the response of any excitation and measurement scheme that uses all three terminals P1, P2 and P3.

As shown in FIG. 9B, this type of excitation can achieve deep focusing of the magnetic fields 212 near the center 904a of the coil antenna 902, which increases the sensitivity to the second pipe 108b (FIG. 9A). Again, it may be possible to control the excitation between the second and third terminals P2, P3 independently as compared to the first and third terminals P1, P3 to achieve different magnetic field distributions and focusing effects. In particular, application of the same current or voltage between the first and third terminals P1, P3 and the second and third terminals P2, P3 should yield optimal focusing away from pipe collars or other axial non-uniformities that may be present in the first and second pipes 108a,b (FIG. 9A).

Figure 11:
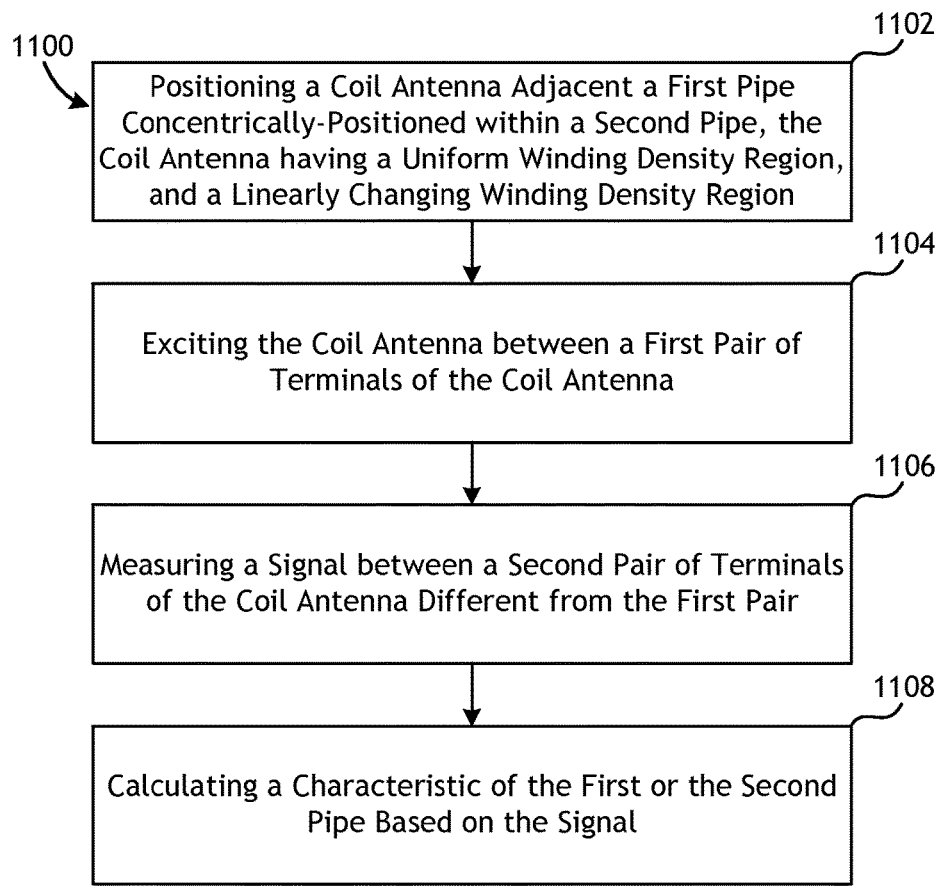
FIG. 11 is a schematic flowchart of an exemplary method of operating the coil antenna of FIGS. 9A-9B and 10A.

FIG. 11 is a schematic flowchart of an exemplary method 1100 of operating the coil antenna 902 of FIGS. 9A-9B and 10A, according to one or more embodiments. According to the method 1100, the coil antenna 902 may be positioned adjacent a first pipe 108a (FIG. 9A), as at 1102, which may be concentrically-positioned within the second pipe 108b (FIG. 9A). As discussed above, the coil antenna 902 may include at least three terminals P1, P2, and P3, where the third terminal radially interposes the first and second terminals P1, P2 at an intermediate radial location 1000 (FIG. 10A) between the center 904a (FIG. 10A) and the outer perimeter 904b (FIG. 10A). The coil antenna 902 may include a uniform winding density extending across a first region and a linearly changing winding density extending across a second region. In at least one embodiment, the linearly changing winding density may extend at least between the first and the third terminals P1, P3 (FIG. 10A).

The coil antenna 902 may then be excited by passing an alternating current or voltage between a first pair of the three terminals P1, P2, and P3, as at 1104. A signal may then be measured between a second pair of the three terminals P1, P2, and P3 different from the first pair, as at 1106. When normalized by the excitation, the measured signal may comprise a measure of complex valued impedance between the second pair of the three terminals P1, P2, and P3. Finally, one or more characteristics of the first pipe 108a and/or the second pipe 108b may be calculated based on the signal measured between the second pair of the three terminals P1, P2, and P3, as at 1108. Again, example characteristics the first and/or second pipes 108a,b that may be calculated include, but are not limited to, the thickness, the magnetic permeability, the conductivity, and the diameter of the first and second pipes 108a,b (or additional pipes beyond the second pipe 108b, if present), and details of converting the measured impedance to the pipe characteristics will be discussed below.

Using any of the embodiments described herein, multiple measurements around a borehole (i.e., the wellbore 104 of FIGS. 1, 2A, 6A, and 9A) can be made to construct an image of the features of the pipes disposed therein beyond the first pipe 108a. For instance, multiple measurements may be obtained with pipe inspection tools (i.e., pipe inspection tools 114, 200, 600, and 900 of FIGS. 1, 2A, 6A, and 9A, respectively) that include multiple sensor pads 202 (FIGS. 2A, 6A, and 9A) mounted to corresponding actuatable arms 206 (FIGS. 2A, 6A, and 9A), and each sensor pad 202 may include one or more of the presently described coil antennas 210, 602, and 902 (FIGS. 2A, 6A, and 9A, respectively). As mentioned above, the actuatable arms 206 may mechanically push the sensor pads 202 as close as possible to the inner wall 208 (FIGS. 2A, 6A, and 9A) of the first pipe 108a and thereby minimize the effects of standoff. Each coil antenna 210, 602, and 902 may then produce a signal that is representative of the features of the pipes (including the first pipe 108a and any pipes radially offset from the first pipe 108a) in that particular azimuth. When images from the multiple sensor pads 202 are concatenated in azimuth dimension, an image of the pipes and any defects present at that azimuth can be constructed.

The depth of investigation of any of the pipe inspection tools 114, 200, 600, and 900 (FIGS. 1, 2A, 6A, and 9A, respectively) described herein may depend on the size of the coil antennas 210, 602, and 902 (FIGS. 2A, 6A, and 9A, respectively) and the presence of a focusing mechanism. Coil antennas 210, 602, and 902 with different sizes may be used to collect data from a number of different investigative depths. It is also possible to use different terminals (i.e., terminals P1, P2, and P3) of the same coil antenna 210, 602, and 902 to electrically achieve the same effect. Moreover, it is also possible to switch between different measurement principles, such as switching between a measurement principle with focusing versus a measurement principle without focusing. For example, for the embodiment shown in FIGS. 9A-9B and 10A, a measurement between the first and third terminals P1, P3 with excitation also at the first and third terminals P1, P3 will produce a shorter (e.g., more shallow) depth of investigation as compared to measurement between the first and third terminals P1, P3 with excitation between the first and second terminals P1, P2.

Frequency of operation and time of measurement may also affect the depth of investigation. Lower frequencies, for example, can achieve deeper sensing as compared to higher frequencies. Similarly, when operating in the time domain, the excitation can be a square pulse and the late time measurements of the decay curve, once the excitation pulse is disconnected, achieve deeper sensing as compared to early time of the decay curve measurements.

Figure 12:
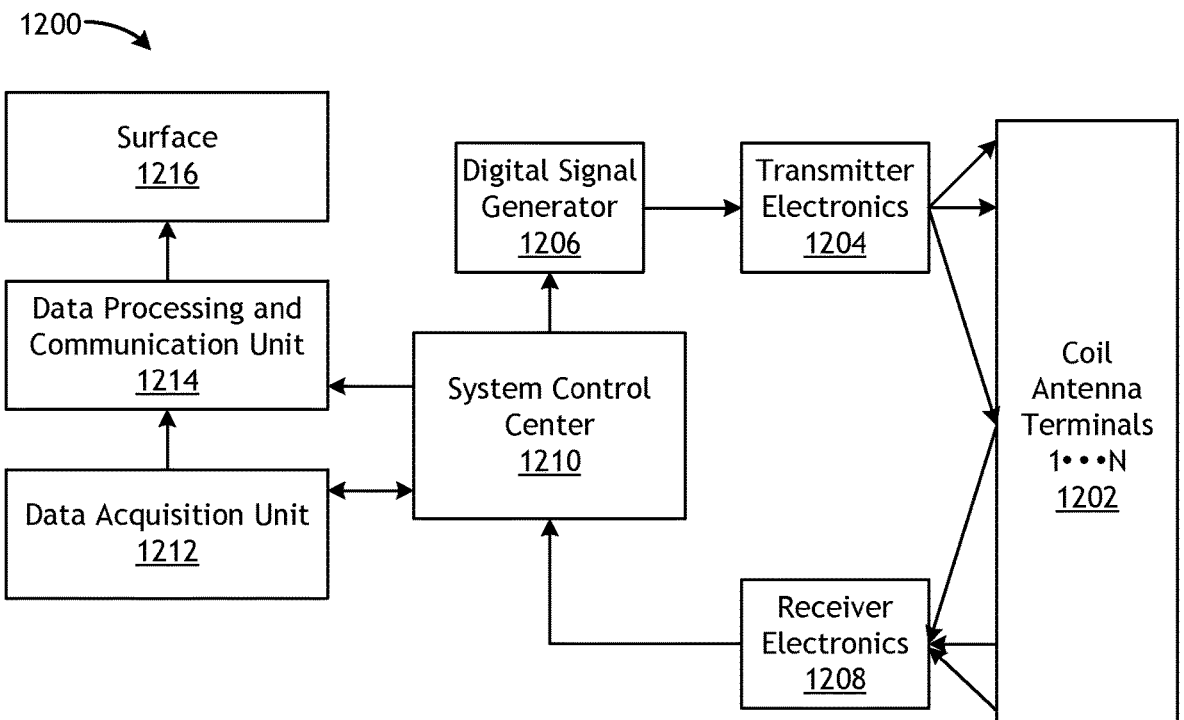
FIG. 12 is a block diagram of an exemplary data acquisition and control system used for monitoring pipes in a wellbore.

Referring now to FIG. 12, illustrated is a block diagram of an exemplary data acquisition and control system 1200 that may be used for monitoring pipes in a wellbore, according to one or more embodiments of the present disclosure. Those skilled in the art will readily appreciate that the data acquisition and control system 1200 as described herein is merely one example of a wide variety of data acquisition systems that can operate in accordance with the principles of this disclosure. Accordingly, the data acquisition and control system 1200 is not to be limited solely to the specific details described herein and other changes or alterations to the structure and processing capabilities may be introduced without departing from the scope of the disclosure.

As illustrated, the data acquisition and control system 1200 may include at least one coil antenna 1202, which may be the same as or similar to any of the coil antennas 210, 602, and 902 (FIGS. 2A, 6A, and 9A, respectively) described herein. The coil antenna 1202 may be driven by transmitter electronics 1204, which may include one or more transmitters, a demultiplexer, a digital-to-analog converter, and other modules or devices used to support operation of the transmitters. Each transmitter may be configured to transmit at least one signal at a particular frequency and, depending on the monitoring application, multiple signals may be transmitted at different frequencies. In some embodiments, a signal generator 1206 may be configured to generate the signals for transmission by the transmitters, the digital-to-analog converter may be configured to convert digital signals to analog signals, and the demultiplexer may be configured to selectively couple the signal generator 1206 to the transmitters. As will be appreciated, any combination of one or more signal generators 1206, digital-to-analog converters, and demultiplexers may be used to drive the transmitters. Alternatively, the transmitters may each perform the function of the signal generator 1206, and the separate signal generator 1206 as part of the transmitter electronics 1204 may be omitted from the data acquisition and control system 1200.

Signals from the coil antenna 120 may be received with receiver electronics 1208, which may include one or more receivers, an analog-to-digital converter, and other modules or devices used to support operation of the receivers. A system control center 1210 may communicably couple the receiver electronics 1208 to the transmitter electronics 1204 and thereby control overall operation of the data acquisition and control system 1200. As illustrated, the system control center 1210 may further be communicably coupled to at least a data acquisition unit 1212 and a data processing and communication unit 1214, thereby placing the receiver electronics 1208 also in communication with such components. In some embodiments, the data acquisition unit 1212 may be configured to determine an amplitude and/or a phase of a received signal. The acquired signal information may be stored, along with acquisition time information in a data buffer of the data acquisition unit 1212. The data buffer may be useful when pipe characteristics are determined based on signals received at different times and/or at different positions within a wellbore.

Data processing may be performed at the earth's surface or at a downhole location where the data acquisition and control system 1200 is arranged. If the data processing is to be performed at the surface, the acquired signal information from the receiver electronics 1208, the data acquisition unit 1212, and the buffered signal information from the data buffer may be conveyed to the data processing and communication unit 1214 which may be configured to transmit the data to the surface 1216 and to a computer or other processing system (not shown) arranged at the surface 1216. If the data processing is to be performed downhole, the data processing and communication unit 1214, in conjunction with the other components of the data acquisition and control system 1200, may be configured to perform the necessary data processing.

Both the computer at the surface 1216 and the system control center 1210 may include multiple processors and a memory configured to receive and store data. The memory may be any non-transitory machine-readable medium that has stored therein at least one computer program with executable instructions that cause the processor(s) to perform the data processing on the received signals. The memory may be, for example, random access memory (RAM), flash memory, read only memory (ROM), programmable read only memory (PROM), electrically erasable programmable read only memory (EEPROM), registers, hard disks, removable disks, a CD-ROM, a DVD, any combination thereof, or any other suitable storage device or medium.

Since the system control center 1210 is coupled to various components of the data acquisition and control system 1200, the system control center 1210 may be configured to adjust or otherwise regulate various parameters of the data acquisition and control system 1200 in order to optimize operation. For example, the system control center 1210 may control the frequencies generated by the signal generator 1206 in the transmitter electronics 1204 or the transmitters. The system control center 1210 may also control the timing of the transmitters. For instance, the system control center 1210 may cause the transmitters to operate sequentially or according to a predetermined transmission sequence such that time-lapse measurements or signals may be obtained by the receivers. From the received signals, characteristics of the pipes may be calculated and otherwise extracted.

More particularly, the excitation and measurement is performed between a number of terminals of the coil antenna 1202. It is possible to excite and measure between the same combination of terminals of the coil antenna 1202, which constitutes a self-impedance measurement. It is also possible to excite and measure between a different combination of terminals of the coil antenna 1202, which constitutes a mutual impedance measurement. While such measurements are taking place, other ports of the coil antenna 1202 may be shorted (in case of voltage-controlled sources) or opened (in case of current-controlled sources).

In general, excitation may be activated by the system control center 1210 and a time-varying signal may be generated by an amplifier included in the signal generator 1206, which is typically converted to analog from digital by using the digital-to-analog converter in the transmitter electronics 1204. The time-varying signal may be sinusoidal with the phase and amplitude of it controlled to a desired value. Typical operating frequency of such a system is between 0.1-1000 Hz. High frequencies suffer attenuation in pipes due to small skin depth, and low frequencies suffer low signal level due to the inductive nature of the measurement. The excitation may also be a pulse of different shapes such as rectangular or triangular pulses.

The resulting magnetic fields that are generated are coupled electromagnetically to the features of the pipes that are next to the antenna coils 1202. At low frequencies, coupling is only through magnetic permeability, but at higher frequencies, conductivity may also be important due to decreasing skin depth. Detected defects in the pipes generate differences in magnetic fields either through magnetic permeability coupling or through conductivity coupling. These changes contain information about the features of the pipes and they are recorded by the receiving antenna of the receiver electronics.

In the case of frequency-domain operation, the received signals can be represented as voltage or current numbers in complex domain with real and imaginary parts, in phasor domain as amplitude and phase, or any other domain that can be obtained by analytical mapping from any of these domains. In the time-domain operation, received signals are magnitudes as a function of time, which can be positive or negative. Results from time and frequency domain can be transferred from one to another by using Fourier transform or inverse Fourier transform. Results may be transferred from analog to digital domain through the use of the analog-to-digital converter included in the receiver electronics 1208. The results may be normalized by the excitation magnitude (excitation current in case of current controlled excitation, excitation voltage in case of voltage controlled excitation), which can yield an impedance measurement.

In addition to the eddy currents that exhibit pipe feature information, a direct coupling from the transmitters to the receivers exists. This direct coupling can be removed by software through the use of an additive term, which is computed in an air calibration step. Yet, another method is to use pulsed excitation with temporally separated transmitting and receiving cycles. In the listening period, the direct coupling dies out polynomially or exponentially and only reflections, scattering or eddy currents from the features are received. In the sinusoidal type excitation, the length of the listening period determines the signal to noise ratio (SNR) of the system. Longer listening times are required to improve SNR, while this also causes slower logging speeds for a fixed vertical resolution for the system.

The sampling frequency also can be optimized to reduce noise while producing enough definition in time to resolve pipe features at different distances to the tool. Listening time is also an important parameter, since features of pipes that are far away mostly arrive at late time. Since downhole memory is limited, it is important to minimize listening time while still maintaining the sensitivity to features that are further away from the tool such as second or third pipe features. For a specific transmitter excitation, multiple receivers can be recorded at the same time. Similarly, multiple excitations and measurements can be performed at the same time and they can be time, frequency or jointly multiplexed for latter demultiplexing operation at the receiver. Upon reception of the signals, they are digitized, stored in a buffer, preprocessed and sent to the surface 1216 using the data processing and communication unit 1214. The data is later inverted and the results of the inversion or raw data can be visualized. Decisions on what to do with the pipes being monitored can be made based on the visualization logging or production.

Figure 13:
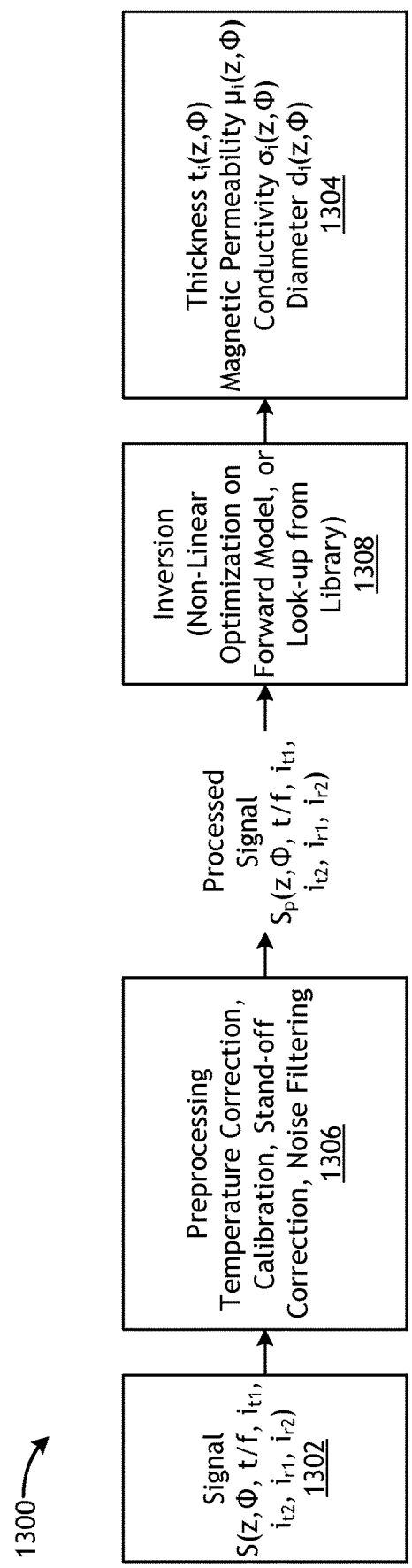
FIG. 13 is a schematic flowchart of a method of converting measurement data into one or more pipe characteristics.

Referring now to FIG. 13, illustrated is a schematic flowchart of a method 1300 of converting measurement data 1302 into one or more pipe characteristics 1304, according to one or more embodiments of the present disclosure. More particularly, the method 1300 may take measurement data 1302 in the form of impedance signals S and convert them into one or more pipe characteristics such as, but not limited to, thickness, magnetic permeability, conductivity, and diameter measurements of any of the pipes.

In the illustrated method 1300, a signal S is measured at time t (time-domain operation) or frequency f (frequency-domain operation) at antenna depth z and antenna azimuth φ between the antenna terminals $i_{r1}$ and $i_{r2}$ as a result of excitation between the terminals $i_{t1}$ and $i_{t2}$. The received signal S may then be preprocessed, as at 1306. Preprocessing the measurement data 1302 may include performing temperature corrections through the use of correlation tables or performing "software focusing" to remove drifts in the electronics. Preprocessing the measurement data 1302 may also include calibration, which may include normalization with the excitation signal amplitude, stand-off correction, to remove the effect of the sensor pad 202 (FIGS. 2A, 6A, and 9A) not touching the pipe, and temporal or spatial filters to reduce noise.

The preprocessed signal Sp may then be fed to an inversion algorithm, as at 1308, which looks up the measured signal in a database that contains mappings between modeled signals and pipe features (thickness, magnetic permeability, conductivity and diameter). The pipe characteristics corresponding to the modeled signal that matches with least mismatch with the measured processed signal may then be selected. This can be written as follows:

$$(\bar{t}(z,\phi), \bar{\mu}(z,\phi), \bar{\sigma}(z,\phi), \bar{d}(z,\phi)) = \underset{\bar{t},\bar{\mu},\bar{\sigma},\bar{d}}{\mathrm{argmin}} \left( \sum_{\frac{t}{f}, i_{t1}, i_{t2}, i_{r1}, i_{r2}} \left( \begin{array}{c} S_p\left(z, \phi, \frac{t}{f}, i_{t1}, i_{t2}, i_{r1}, i_{r2}\right) - \\ S_m\left(\bar{t}, \bar{\mu}, \bar{\sigma}, \bar{d}, \frac{t}{f}, i_{t1}, i_{t2}, i_{r1}, i_{r2}\right) \end{array} \right)^2 \right) \quad \text{Equation (1)}$$

where t(z,φ) is the inverted vector of pipe thicknesses, μ(z,φ) is the inverted vector of pipe magnetic permeabilities, σ(z,φ) is the inverted vector of pipe conductivities, d(z,φ) is the inverted vector of pipe diameters, $S_m$ is the modeled (and processed) measurement, t is the vector of pipe thicknesses of the model, μ is the vector of pipe magnetic permeabilities of the model, σ is the vector of pipe conductivities of the model, and d is the vector of pipe diameters of the model. The foregoing vectors contain information related to a number of pipes, i.e., the first element of the vector is the characteristic associated with the first pipe, the second element of the vector is the characteristic associated with the second pipe, etc.

Different cost functions that involve weighted differences and different norms may also be used. If a quick forward model is available, search of the above minimum may be conducted by using an iterative methods, such as conjugate gradient, etc., in the place of the database lookup. It is also possible use lab measurements in the place of computer models. A range of pipes with different features may be measured and measured signals may be used to construct a library.

Embodiments disclosed herein include:

A. A method that includes positioning a coil antenna in a first pipe concentrically arranged within a second pipe, the coil antenna having a first terminal, a second terminal, and one or more wires that exhibit a winding density proceeding radially between the first and second terminals according to a given function, exciting the first and second terminals with an alternating current or voltage, measuring a signal between the first and second terminals, and calculating a characteristic of at least one of the first and second pipes based on the signal.

B. A method that includes positioning a coil antenna in a first pipe concentrically arranged within a second pipe, the coil antenna having a center and an outer perimeter and including one or more wires that exhibit a winding density proceeding according to a given function radially between the center and the outer perimeter, a first terminal located at the center, a second terminal located at the outer perimeter, and a third terminal radially interposing the first and second terminals at an intermediate radial location between the center and the outer perimeter. The method further including exciting a first pair of the first, second, and third terminals with an alternating current or voltage, measuring a signal between a second pair of the first, second, and third terminals, where the second pair is different from the first pair, and calculating a characteristic of at least one of the first and second pipes based on the signal.

C. A pipe inspection tool that includes a body, a sensor pad operatively coupled to the body, and a coil antenna positioned on the sensor pad and having a first terminal, a second terminal, and one or more wires that exhibit a winding density proceeding radially between the first and second terminals according to a given function.

Each of embodiments A, B, and C may have one or more of the following additional elements in any combination: Element 1: wherein the given function of the winding density is linear. Element 2: wherein the given function of the winding density is uniform. Element 3: wherein the given function of the winding density is linear across a first radial region of the coil antenna and uniform across a second radial region of the coil antenna. Element 4: wherein the coil antenna is positioned on a sensor pad, and wherein positioning the coil antenna in the first pipe comprises extending the sensor pad toward an inner wall of the first pipe with actuatable arms coupled to a body of a pipe inspection tool, and positioning the coil antenna adjacent or in contact with the inner wall of the first pipe. Element 5: wherein the characteristic of at least one of the first and second pipes is selected from the group consisting of a thickness, a magnetic permeability, a conductivity, and a diameter.

Element 6: wherein the given function of the winding density is linear across a first radial region of the coil antenna and uniform across a second radial region of the coil antenna. Element 7: wherein first radial region extends between the first and third terminals. Element 8: wherein the coil antenna is positioned on a sensor pad, and wherein positioning the coil antenna in the first pipe comprises extending the sensor pad toward an inner wall of the first pipe with actuatable arms coupled to a body of a pipe inspection tool, and positioning the coil antenna adjacent or in contact with the inner wall of the first pipe. Element 9: wherein the characteristic of at least one of the first and second pipes is selected from the group consisting of a thickness, a magnetic permeability, a conductivity, and a diameter.

Element 10: wherein the sensor pad is operatively coupled to the body with one or more actuatable arms radially extendable from the body. Element 11: wherein the one or more wires comprises a spiral-wound wire structure that extends continuously between the first and second terminals. Element 12: wherein the spiral-wound wire structure is one of circular or polygonal. Element 13: wherein the one or more wires comprises a plurality of concentric wire rings. Element 14: wherein the given function of the winding density is linear. Element 15: wherein the given function of the winding density is uniform. Element 16: wherein the given function of the winding density is linear across a first radial region of the coil antenna and uniform across a second radial region of the coil antenna. Element 17: wherein the coil antenna further includes a third terminal radially interposing the first and second terminals at an intermediate radial location between a center of the coil antenna and an outer perimeter of the coil antenna. Element 18: wherein the given function of the winding density is linear between the first and third terminals.

By way of non-limiting example, exemplary combinations applicable to A, B, and C include: Element 6 with Element 8; Element 11 with Element 12; and Element 17 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
 positioning a coil antenna in a first pipe concentrically arranged within a second pipe, the coil antenna having a first terminal, a second terminal, and one or more wires that exhibit a winding density proceeding radially between the first and second terminals such that each winding of the coil antenna is laid out on a predetermined path with radial gaps between radially adjacent windings that control the winding density according to a given function;

exciting the first and second terminals with an alternating current or voltage;

measuring a signal between the first and second terminals; and calculating a characteristic of at least one of the first and second pipes based on the signal, wherein the coil antenna is positioned on a sensor pad, and wherein positioning the coil antenna in the first pipe comprises:
  extending the sensor pad toward an inner wall of the first pipe with actuatable arms coupled to a body of a pipe inspection tool; and
  positioning the coil antenna adjacent or in contact with the inner wall of the first pipe;
wherein the given function of the winding density is linear across a first radial region of the coil antenna and uniform across a second radial region of the coil antenna.

2. The method of claim 1, wherein the characteristic of at least one of the first and second pipes is selected from the group consisting of a thickness, a magnetic permeability, a conductivity, and a diameter.

3. A method, comprising:
positioning a coil antenna in a first pipe concentrically arranged within a second pipe, the coil antenna having a center and an outer perimeter and including:
  a wire that exhibits a winding density proceeding according to a given function radially between the center and the outer perimeter;
  a first terminal on the wire located at the center;
  a second terminal on the wire located at the outer perimeter; and
  a third terminal radially interposing the first and second terminals at an intermediate radial location on the wire between the center and the outer perimeter;
exciting a first pair of the first, second, and third terminals with an alternating current or voltage;
measuring a signal between a second pair of the first, second, and third terminals, where the second pair is different from the first pair; and
calculating a characteristic of at least one of the first and second pipes based on the signal.

4. The method of claim 3, wherein the given function of the winding density is linear across a first radial region of the coil antenna and uniform across a second radial region of the coil antenna.

5. The method of claim 4, wherein first radial region extends between the first and third terminals.

6. The method of claim 3, wherein the coil antenna is positioned on a sensor pad, and wherein positioning the coil antenna in the first pipe comprises:
  extending the sensor pad toward an inner wall of the first pipe with actuatable arms coupled to a body of a pipe inspection tool; and
  positioning the coil antenna adjacent or in contact with the inner wall of the first pipe.

7. The method of claim 3, wherein the characteristic of at least one of the first and second pipes is selected from the group consisting of a thickness, a magnetic permeability, a conductivity, and a diameter.

8. A pipe inspection tool, comprising:
a body;
a sensor pad operatively coupled to the body; and
a coil antenna positioned on the sensor pad and having a first terminal, a second terminal, and one or more wires that exhibit a winding density proceeding radially between the first and second terminals such that each winding of the coil antenna is laid out on a pre-determined path with radial gaps between radially adjacent windings that control the winding density according to a given function, wherein at least a portion of the given function of the winding density is linearly increasing or linearly decreasing with radial distance from the first terminal to the second terminal, wherein at least another portion of the given function of the winding density is uniform and unchanging with radial distance from the first terminal.

9. The pipe inspection tool of claim 8, wherein the sensor pad is operatively coupled to the body with one or more actuatable arms radially extendable from the body.

10. The pipe inspection tool of claim 8, wherein the one or more wires comprises a spiral-wound wire structure that extends continuously between the first and second terminals.

11. The pipe inspection tool of claim 10, wherein the spiral-wound wire structure is one of circular or polygonal.

12. The pipe inspection tool of claim 8, wherein the one or more wires comprises a plurality of concentric wire rings.

13. The pipe inspection tool of claim 8, wherein the given function of the winding density is linearly increasing across a first radial region of the coil antenna and uniform and unchanging across a second radial region of the coil antenna.

14. The pipe inspection tool of claim 8, wherein the coil antenna further includes a third terminal radially interposing the first and second terminals at an intermediate radial location between a center of the coil antenna and an outer perimeter of the coil antenna.

15. The pipe inspection tool of claim 14, wherein the given function of the winding density is linearly increasing between the first and third terminals.

16. A pipe inspection tool, comprising:
a body;
a sensor pad operatively coupled to the body; and
a coil antenna positioned on the sensor pad and having a first terminal, a second terminal, and one or more wires that exhibit a winding density proceeding radially between the first and second terminals such that each winding of the coil antenna is laid out on a pre-determined path with radial gaps between radially adjacent windings that control the winding density according to a given function, wherein the given function of the winding density is linearly increasing across a first radial region of the coil antenna and uniform and unchanging across a second radial region of the coil antenna.

17. The pipe inspection tool of claim 16, wherein the sensor pad is operatively coupled to the body with one or more actuatable arms radially extendable from the body.

18. The pipe inspection tool of claim 16, wherein the one or more wires comprises a spiral-wound wire structure that extends continuously between the first and second terminals.

19. The pipe inspection tool of claim 18, wherein the spiral-wound wire structure is one of circular or polygonal.

20. The pipe inspection tool of claim 16, wherein the one or more wires comprises a plurality of concentric wire rings.

21. The pipe inspection tool of claim 16, wherein the given function of the winding density is linearly increasing across a first radial region of the coil antenna and uniform and unchanging across a second radial region of the coil antenna.

22. The pipe inspection tool of claim 16, wherein the coil antenna further includes a third terminal radially interposing the first and second terminals at an intermediate radial location between a center of the coil antenna and an outer perimeter of the coil antenna.

\* \* \* \* \*